Feb. 15, 1944.  R. I. ROBBINS ET AL  2,341,742
MACHINE TOOL DRIVE
Filed Nov. 13, 1942  4 Sheets-Sheet 1

Inventors.
Ralph I. Robbins,
Thorvald S. Ross.
By Emery, Booth, Townsend, Miller & Neidner
Attys.

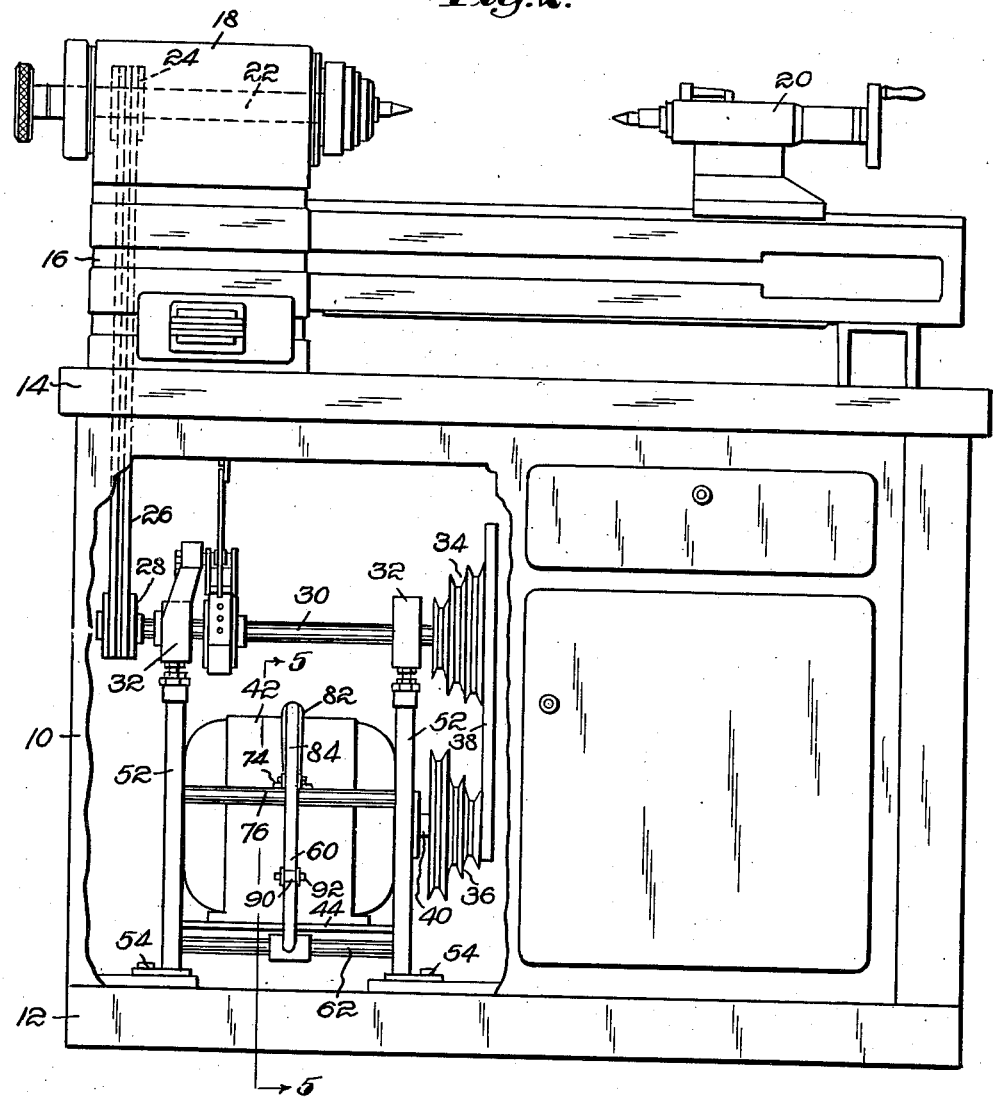

Feb. 15, 1944.    R. I. ROBBINS ET AL    2,341,742
MACHINE TOOL DRIVE
Filed Nov. 13, 1942    4 Sheets-Sheet 3
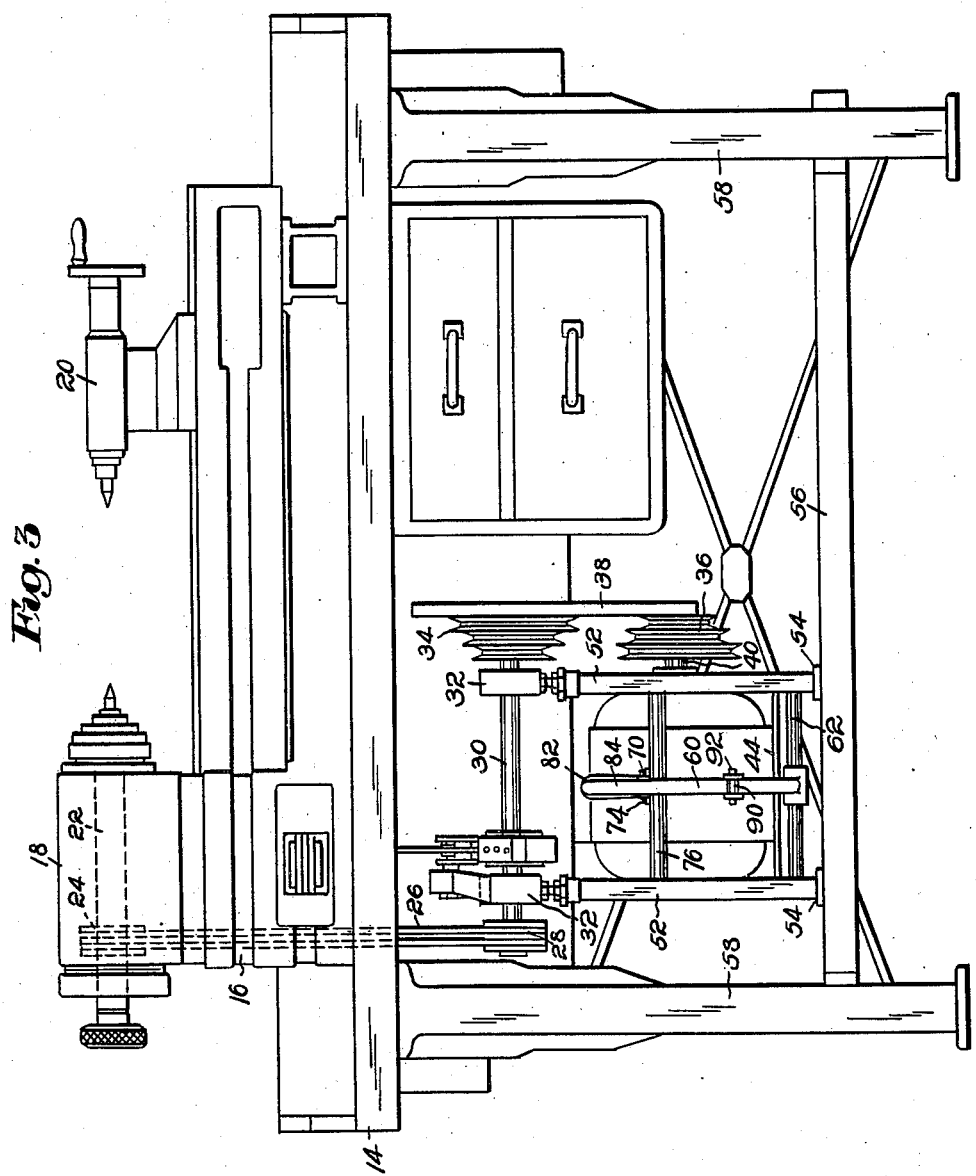

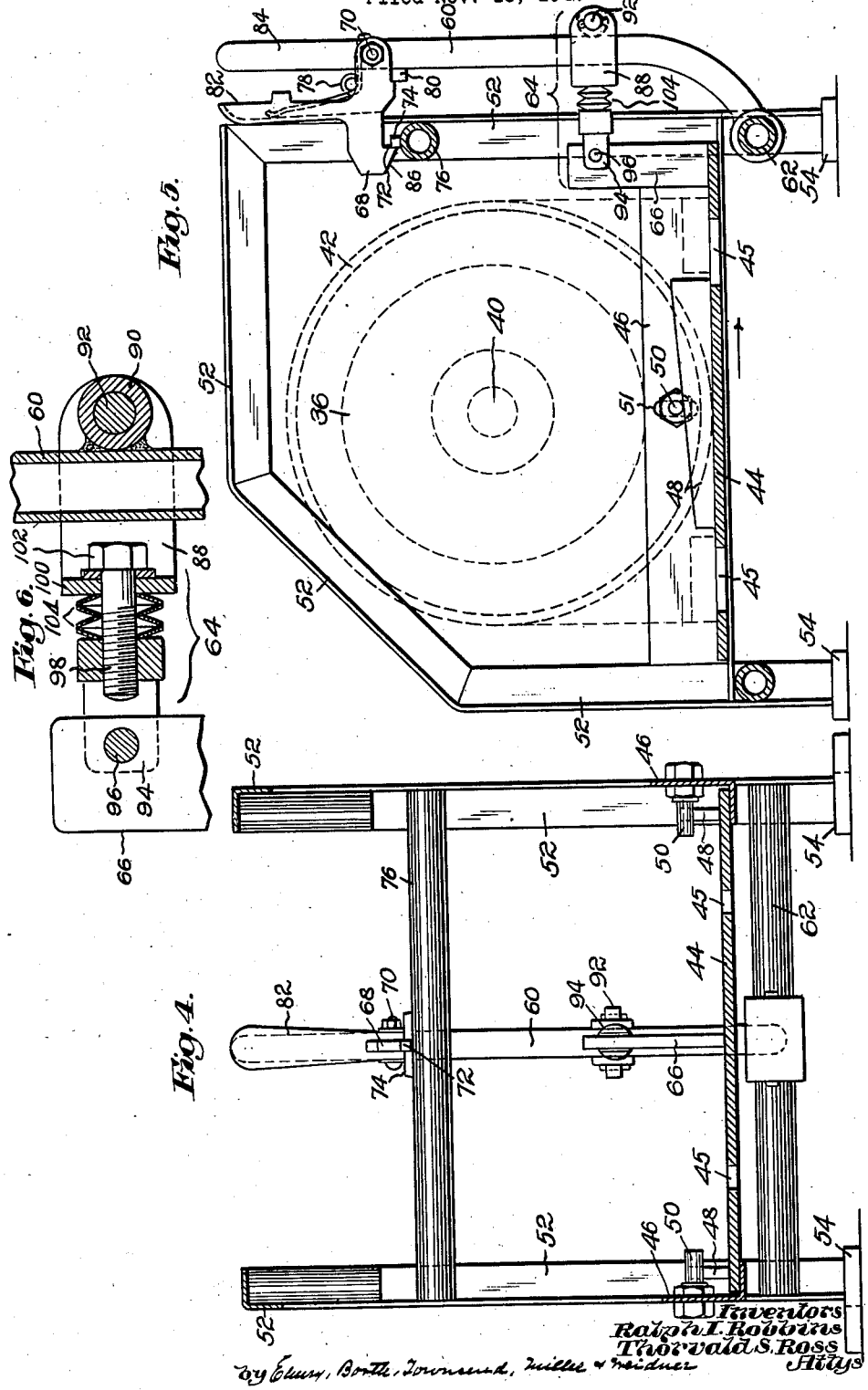

Patented Feb. 15, 1944

2,341,742

UNITED STATES PATENT OFFICE 2,341,742

MACHINE TOOL DRIVE

Ralph I. Robbins, Andover, and Thorvald S. Ross, Cambridge, Mass., assignors to Rivett Lathe & Grinder, Inc., Boston, Mass., a corporation of Massachusetts Application November 13, 1942, Serial No. 465,474

19 Claims. (Cl. 74—242.13)

This invention relates to a drive for a machine tool such as a bench lathe for example, wherein the headstock spindle is driven by a jackshaft, the latter in turn being driven at various speeds by a speed-changing mechanism comprising two stepped pulleys and a connecting belt, one pulley receiving power from an electric motor. The invention presently to be described is concerned with a simple, effective, and low-cost arrangement providing for the shifting of a belt and the rigid locking of the belt-shifting mechanism in the normal operating position in which power is transmitted from the motor to the headstock spindle.

The invention will best be understood by reference to the following description when taken in connection with the accompanying drawings of specific embodiments thereof, while its scope will be pointed out more particularly in the appended claims.

In the drawings:

Fig. 2 is a front elevation of the same;

Fig. 3 is a front elevation of a bench lathe equipped with the drive;

Fig. 4 is a vertical, longitudinal sectional view on an enlarged scale on line 4—4 of Fig. 1 looking toward the front;

Fig. 5 is a vertical, transverse, sectional view on an enlarged scale on line 5—5 of Fig. 2 looking toward the right; and Fig. 6 is a vertical, longitudinal sectional view, on a further enlarged scale, illustrating the composite link.

Figure 1:
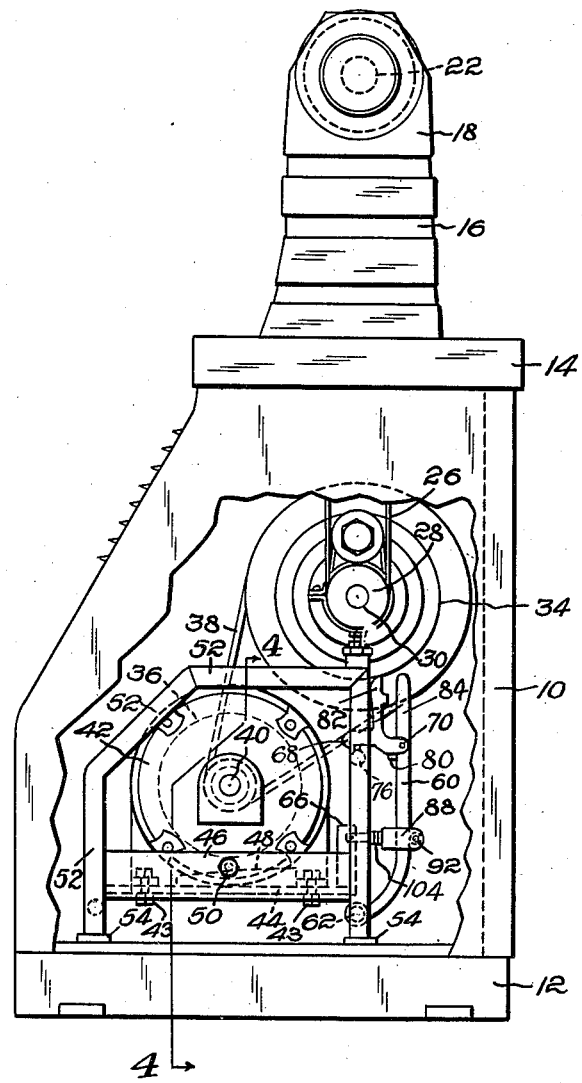
Fig. 1 is a left-hand end elevation of a cabinet mounted lathe equipped with a drive embodying the invention.

Referring to the drawings and to the embodiments of the invention illustrated therein by way of example, there is shown in Figs. 1 and 2 a fabricated metal cabinet 10 having a base 12 and surmounted by a bench or pan 14 which supports a lathe bed 16, the latter in turn supporting a headstock 18 and a tailstock 20. The headstock is provided with a spindle 22 and double-grooved pulley 24, fully enclosed, and connected by a pair of V-belts 26 to a double-grooved pulley 28 on a jackshaft 30 supported by vertically adjustable and horizontally swivelling but normally locked bearings 32, which hold the shaft 30 in correct alignment and free-running condition. The jackshaft is driven by upper and lower stepped pulleys 34 and 36 connected by a V-belt 38, the upper pulley being secured to the jackshaft and the lower pulley to a rotor shaft 40 of an electric motor 42.

The motor 42 is adjustably secured to a plate 44 as by bolts 43 (see Fig. 1) passing through slots 45 in the plate (see Figs. 4 and 5), mounted to slide horizontally, forwardly and rearwardly, on guides presented by angle bars 46. The bolts 43 and slots 45 are provided so that the motor may be properly positioned fore and aft to compensate for variations in the length of the V-belts and to keep the action of the operating lever in good working range. By reference to Fig. 1 it will be observed that the upper and lower, stepped pulleys 34 and 36 are out of vertical alignment, the lower one being disposed rearwardly of the upper one, the arrangement being such that horizontal movement of the lower one forwardly, i. e., toward a vertical plane containing the axis of the upper one, loosens the belt 38, and conversely, rearward movement of the lower one tightens the belt. These forward and rearward movements are produced by sliding the motor plate 44 on its guides 46.

When the motor plate is in its normal position in which the motor drives the lathe, the motor plate (and hence the motor and the lower pulley) is securely locked by appropriate means such as one or more, herein two, wedges 48 secured to the motor plate 44 and movable lengthwise beneath studs 50 adjustable vertically in slots 51 in the vertical webs of the angle bar guides 46. Thus, horizontal movement of the motor plate 44 rearwardly is utilized to wedge the plate downwardly upon the guides 46 and to lock the motor 42 and hence the lower pulley 36 against displacement during the normal operation of the lathe. Conversely, forward movement of the plate frees the motor and hence the lower pulley, so that the belt 38 may be shifted to provide a different ratio to drive the lathe at another speed. The extent of rearward movement of the motor plate, and hence the degree of tension of the belt is determined by the vertical adjustment of the studs 50. However, the bolts 43 and the slots 45 are all employed by the assembler to obtain an initial adjustment of the belt tension.

The anglebars 46 constitute parts of anglebar frames 52 supporting the jackshaft bearings 32 and having feet 54 resting upon and suitably secured to an underlying support such as the base 12 of the metal cabinet 10, or a plank 56 (see Fig. 3) supported by legs 58, or the feet may even rest upon the floor. In any case, the frame provides a firm support for the motor and for the jackshaft, and for the operating mechanism presently to be described. While the frames might be made up of castings, it has been found that the cost can be reduced greatly by the use of pipes, and better still, by the use of structural members such as angle bars cut, bent and welded into the form shown, for example, in Fig. 5, and yet the frames are fully as strong and altogether satisfactory in every way as ones made up of castings.

The motor plate 44 is operated by appropriate mechanism such as that now to be described, reference being had to Figs. 4 and 5. An operating lever 60 fulcrumed on a strut 62 which connects the frames 52 is connected by a link 64 (of special construction, presently to be described) to a bracket 66 suitably secured, as by welding, to the motor plate 44. The operating lever 60 normally is secured in its upright position, as shown, by suitable means such as a latch or dog 68 pivoted at 70 on the operating lever. The latch has a tooth 72 which normally engages the rear face of a lug 74 on a strut 76 connecting the frames 52. This engagement normally is maintained by a spring 78 which urges the latch downwardly toward the strut. Downward movement of the latch, under the influence of the spring, is limited by a stop 80 on the lever 60. The latch is provided with a handle 82 and the operating lever 60 is provided with a handle 84 in proximity thereto, so that by grasping 72 may be disengaged from the lug 74, whereupon the operating lever 60 may be swung forwardly (toward the right in Fig. 5) and thus operating through the specially constructed link 64 to slide the motor plate 44 toward the front, thereby to loosen the belt. When the operating lever is restored to its initial position, a sloping surface 86 on the latch tooth 72 rides up and over the lug 74 on the strut 76.

The link 64 is loosely coupled to the lever 60 by the construction now to be described. A clevis or fork 88 loosely embracing the operating lever 60 also embraces a hinge piece 90 which encircles a pin 92 passing through the sides of the fork. The hinge piece 90 is suitably secured as by welding to the outer or front side of the operating lever 60. At the other end of the link, a clevis or fork 94 embraces the bracket 66 and is attached thereto by a pin 96. A stud 98 threaded into the clevis 94 extends loosely through a transverse wall 100 of the clevis 88 and is provided with a head 102 resting against the inner face of said transverse wall and normally maintained in engagement therewith by an appropriate resilient member, herein two pairs of concavo-convex or saucer-shaped springs 104 (called Bellville springs) the rims of the members of each pair being placed face to face and the concave surfaces being opposed to each other.

When the operator wishes to shift the belt, he places the palm of his hand against the lever handle 84, wraps his fingers about the latch handle 82, and pulls the latter toward the former, thus overcoming the spring 78, lifting the latch 68 from the lug 74, and freeing the operating lever 60 which can now be pulled toward the operator. The composite link 64 is now positive in its action and pulls the motor plate 44, with the motor 42 and the lower pulley toward the operator, the wedges 48, meantime, withdrawing from their engagement with the studs 50. The belt 38 is now slackened and can be shifted, after which the parts are restored to their normal positions by a reversal of the foregoing operation. After the motor plate 44 and the motor 42 have been fully restored, and hence are immovable, the springs 104 yield sufficiently to enable the operating lever 60 to continue its movement to enable the latch 68 to pass over and beyond the lug 74 and to drop behind the latter. The operator now removes his hand from the handles 82 and 84, whereupon the springs restore the operating lever 60 to its normal upright position.

Having thus described one embodiment of the invention, what we claim and desire, by Letters Patent, to secure is:

1. The combination of two pulleys and a connecting belt and means to utilize horizontal movement of one pulley to slacken and to tighten said belt, said means including a motor which supports and drives such pulley, a horizontally slidable motor platform, a guide on which said platform is slidable, and means to utilize horizontal movement of said platform in one direction to bind said platform to said guide and to utilize horizontal movement of said platform in the opposite direction to free said platform.

2. The combination of two pulleys and a connecting belt and means to utilize horizontal movement of one pulley to slacken and to tighten said belt, said means including a motor which supports and drives such pulley, a horizontally slidable motor platform, a guide on which said platform is slidable, and means including a wedge to utilize horizontal movement of said platform in one direction to bind said platform to said guide and to utilize horizontal movement of said platform in the oppostie direction to free said platform.

3. In a belt slackening and tightening arrangement, the combination of a pulley supporting platform, platform locking means including a wedge, an operating lever which releases and moves said platform, and manually operable, lever detent means.

4. In a belt slackening and tightening arrangement, the combination of a pulley supporting platform, platform locking means including a wedge, an operating lever which releases and moves platform, and manually operable, lever detent means including a latch carried by said lever.

5. In a belt slackening and tightening arrangement, the combination of a pulley supporting platform, platform locking means including a wedge, an operating lever which releases and moves platform, and manually operable, lever detent means including a latch carried by said lever and provided with a handle to be grasped by the hand which grasps said lever.

6. In a belt slackening and tightening arrangement, the combination of a pulley supporting platform, platform locking means including a wedge, a platform operating lever, and manually operable, lever detent means carried by said lever.

7. In a belt slackening and tightening arrangement, the combination of a pulley supporting platform, platform locking means including a wedge, a platform operating lever, and manually operable, lever detent means carried by said lever and provided with a handle to be grasped by the hand which grasps said lever.

8. In a mechanism for slackening and tightening a belt connecting two pulleys, the combination of a horizontally slidable platform, platform locking means including a wedge, a platform operating lever, and a lever retaining latch.

9. In a mechanism for slackening and tightening a belt connecting two pulleys, the combination of a horizontally slidable platform, platform locking means including a wedge, a platform operating lever, and a lever retaining latch carried by said lever.

10. In a mechanism for slackening and tightening a belt connecting two pulleys, the combination of a horizontally slidable platform, platform locking means including a wedge, a platform operating lever, and a link connecting said lever to said platform.

11. In a mechanism for slackening and tightening a belt connecting two pulleys, the combination of a horizontally slidable platform, platform locking means including a wedge, a platform operating lever, a link connecting said lever to said platform, and a latch for retaining said lever in its normal position.

12. In a mechanism for slackening and tightening a belt connecting two pulleys, the combination of a horizontally slidable platform, platform locking means including a wedge, a platform operating lever, a lever retaining latch, and a latch retaining spring.

13. In a mechanism for slackening and tightening a belt connecting two pulleys, the combination of a horizontally slidable platform, platform locking means including a wedge, a platform operating lever, a lever retaining latch, and a connection between said lever and said platform and including resilient means permitting over-travel of said lever when moving past the normal, latched position of said latch.

14. In a mechanism for slackening and tightening a belt connecting two pulleys, the combination of a horizontally slidable platform, platform locking means including a wedge, a platform operating lever, a lever retaining latch carried by said lever, and a connection between said lever and said platform and including resilient means permitting over-travel of said lever and said latch when moving past the normal, latched position of said lever.

15. In a belt slackening and tightening arrangement, the combination of a movable pulley support, pulley support locking means, and an operating lever which swings in the direction in which said support moves and which unlocks said locking means and moves said support.

16. In a belt slackening and tightening arrangement, the combination of a movable pulley support, pulley support locking means, an operating member which unlocks said locking means and moves said support, and a detent for said operating member.

17. In a belt slackening and tightening arrangement, the combination of a movable pulley support, a pulley support locking member, and an operating member which swings in the direction in which said support moves and operates said locking member to unlock said support and which operating member also operates said support to slacken said belt.

18. In a belt slackening and tightening arrangement, the combination of a movable pulley support, a pulley support locking member, an operating member which operates said locking member to unlock said support and which also operates said support to slacken said belt, and a retaining member which normally retains said operating member in non-operating position.

19. In a belt slackening and tightening arrangement, the combination of a movable pulley support, a base, pulley support retaining means to urge said support toward said base, and operating means distinct from said retaining means and operating to relieve said urge and to move said support along said base.

THORVALD S. ROSS.
RALPH I. ROBBINS.